M. F. WILLIAMS.
SHREDDING HAMMER.
APPLICATION FILED OCT. 29, 1910.
1,033,506.
Patented July 23, 1912.
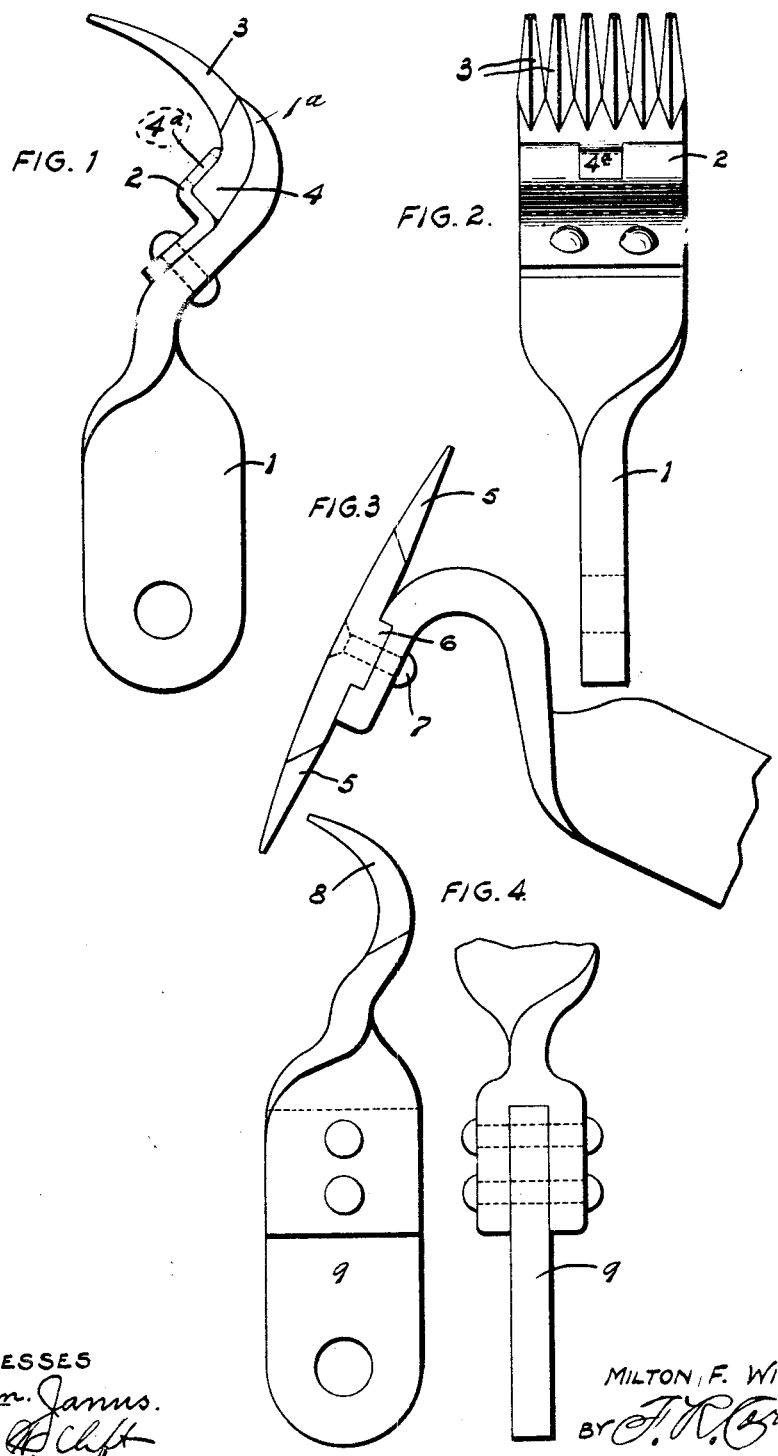
WITNESSES
INVENTOR
MILTON F. WILLIAMS

UNITED STATES PATENT OFFICE.

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

SHREDDING-HAMMER.

1,033,506. Specification of Letters Patent. Patented July 23, 1912.

Application filed October 29, 1910. Serial No. 589,800.

*To all whom it may concern:*

Be it known that I, MILTON F. WILLIAMS, a citizen of the United States, residing at St. Louis, Missouri, have invented a certain new and useful Improvement in Shredding-Hammers, of which the following is a full, clear, and exact description, such as will enable others skilled in the art to which it appertains to make and use the same, reference being had to the accompanying drawings, forming part of this specification, in which—

Figure 1 is a side elevational view of my improved hammer; Fig. 2 is a front elevational view of the same; Fig. 3 is a modified form; Fig. 4 illustrates a side and front elevation of a modified form.

This invention relates generally to shredding machines of the rotary hammer type, and more particularly to hammers or beaters for shredding machines, which hammers or beaters are provided at one end with a series of prongs or tines, that bear cutting edges adapted to coöperate with parts within the machine in which the hammers or beaters are used, for cutting and shredding the material delivered into the machine.

The present invention is designed particularly for use in shredding cloth and other fibrous material which is fed into the machine over projections, such as shown in Patent No. 953,111, granted to me March 29, 1910, where it is acted upon by the hammers or beaters until shredded or reduced.

A special feature of my present invention resides in the provision of a hammer or beater whose cutting edge is provided with tines, preferably triangular in shape, and whose side cutting edges are inclined slightly to the path of travel of the revolving beater whereby, after the point of the tine enters the material the tine makes a shearing cut to cut the material.

In the drawings, 1 indicates the shank of a hammer or beater which is provided with an opening whereby it is pivotally mounted upon its support. This shank is given a quarter turn and has its outer end bent or curved as shown.

2 indicates a clamp held in position by rivets and having an overhanging portion for securing the cutting tines 3 in position. These tines, as shown in Figs. 1 and 2, extend from a solid bar 4 and are curved forwardly and outwardly. The bar 4 is wedge-shaped so as to be held in position by the overhanging portions of the clamp, and the said bar is provided with a central projection 4ª which extends up into a slot in the clamp to prevent lateral movement thereof. The tines 3 are preferably triangular in shape, as shown, having their ends sharpened so as to easily enter the material to be shredded. The side edges of these tines are slightly inclined so as to effect a shearing cut. In the event that material is wedged into the tines, additional material crowding down upon it will effect a severance of the fibers and hence I prefer to have the side cutting edges meet in a sharp angle as shown.

In Fig. 3 I have shown a reversible shredding blade 5 having tines on its front and rear edges and being provided with a projection 6 which is received in a groove in the outer end of the shank. A rivet 7 holds the parts together.

In Fig. 4 the tines 8 are provided with means for connection with a straight shank 9.

In all of the above forms of my invention the comb-shaped beater has a number of tines provided with inclined cutting edges and sharp entering points, the beater being renewable or reversible, as the case may be, in the event of wear.

The curved edge 1ª of the supporting shank is preferably sharpened so that in the event that fibrous material is crowded between the tines said sharpened edge will tend to sever it.

I claim:

1. In a device of the character described the combination of a shank, a part removably secured to said shank, said last named part having a plurality of forwardly and outwardly curved tines tapering from base to point and triangular in cross section.

2. In a shredding hammer the combination with a shank, of a member detachably applied to one end of said shank, which member comprises a series of tines which are directed transversely of said shank, and the projecting portions of which tines have medial and lateral cutting edges and entering points.

3. The herein-described shredding hammer comprising a shank and a member having a series of tines detachably applied to one end of said shank, which tines gradually taper toward their outer ends and are provided on their sides with cutting edges.

4. In a shredding hammer the combination with a shank, of a tine detachably applied to one end of said shank, which tine tapers gradually toward its outer end and is provided with a pair of oppositely disposed cutting edges and a medial cutting edge.

In testimony whereof I hereunto affix my signature in the presence of two witnesses, this 25th day of October, 1910.

MILTON F. WILLIAMS.

Witnesses:
M. P. SMITH,
B. L. CROWLEY.